US012593153B2

(12) United States Patent
Sun et al.

(10) Patent No.: US 12,593,153 B2
(45) Date of Patent: Mar. 31, 2026

(54) NCF DEVICE ASSEMBLY, DISTRIBUTED NETWORKING SYSTEM, AND DATA TRANSMISSION METHOD

(71) Applicant: Beijing Star-net Ruijie Networks Co., Ltd., Beijing (CN)

(72) Inventors: Anbing Sun, Beijing (CN); Xusheng Cheng, Beijing (CN); Dapeng Liu, Beijing (CN); Weicao Chen, Beijing (CN)

(73) Assignee: Beijing Star-net Ruijie Networks Co., Ltd., Beijing (CN)

( * ) Notice: Subject to any disclaimer, the term of this patent is extended or adjusted under 35 U.S.C. 154(b) by 0 days.

(21) Appl. No.: 19/225,239

(22) Filed: Jun. 2, 2025

(65) Prior Publication Data

US 2025/0294273 A1     Sep. 18, 2025

Related U.S. Application Data

(63) Continuation of application No. PCT/CN2024/085030, filed on Mar. 29, 2024.

(30) Foreign Application Priority Data

Mar. 31, 2023     (CN) .......................... 202310342107.3

(51) Int. Cl.
H04Q 11/00     (2006.01)
G02B 6/35     (2006.01)

(52) U.S. Cl.
CPC ......... H04Q 11/0005 (2013.01); G02B 6/356 (2013.01); H04Q 11/0062 (2013.01); H04Q 2011/0016 (2013.01)

(58) Field of Classification Search
CPC .................................................. H04Q 11/0005
See application file for complete search history.

(56) References Cited

U.S. PATENT DOCUMENTS

2023/0308787 A1*     9/2023     Patronas ............ H04Q 11/0005

FOREIGN PATENT DOCUMENTS

CN     105376659 A     3/2016
CN     105474565 A     4/2016
(Continued)

OTHER PUBLICATIONS

Shen et al., Coherent and Incoherent Crosstalk in WDM Optical Networks, Journal of Lightwave Technology, vol. 17, No. 5, May 1999 (Year: 1999).*
(Continued)

*Primary Examiner* — Shi K Li
(74) *Attorney, Agent, or Firm* — ArentFox Schiff LLP; Michael Fainberg

(57) ABSTRACT

The NCF device assembly includes: a first NCF device, including a first chip and first NCF ports, where the first chip is electrically communicatively connected to at least one of the first NCF ports; a second NCF device, including a second chip and second NCF ports, where the second chip is electrically communicatively connected to at least one of the second NCF ports; and a reconstruction component optical cross-connect device, including receiving ports and reconstruction ports, where the receiving ports are communicatively connected to the first chip and the second chip respectively through at least one of the first NCF ports and at least one of the second NCF ports. Each of the reconstruction ports is optically communicatively connected to at least two receiving ports in the reconstruction component optical cross-connect device, so that each reconstruction port is communicatively connected to the first chip and the second chip.

17 Claims, 6 Drawing Sheets

(56) References Cited

FOREIGN PATENT DOCUMENTS

| CN | 111954099 A | 11/2020 |
| JP | 2007-259272 A | 10/2007 |

OTHER PUBLICATIONS

Written Opinion and International Search Report for PCT/CN2024/085030 dated Jun. 15, 2024.

\* cited by examiner

Box 501

Reconstruction component
optical cross-connect
device 503

NCF device 502

NCF device 502

Optical cross-
connect unit 601

Reconstruction
component
optical cross-
connect device
60

Reconstruction
port 602

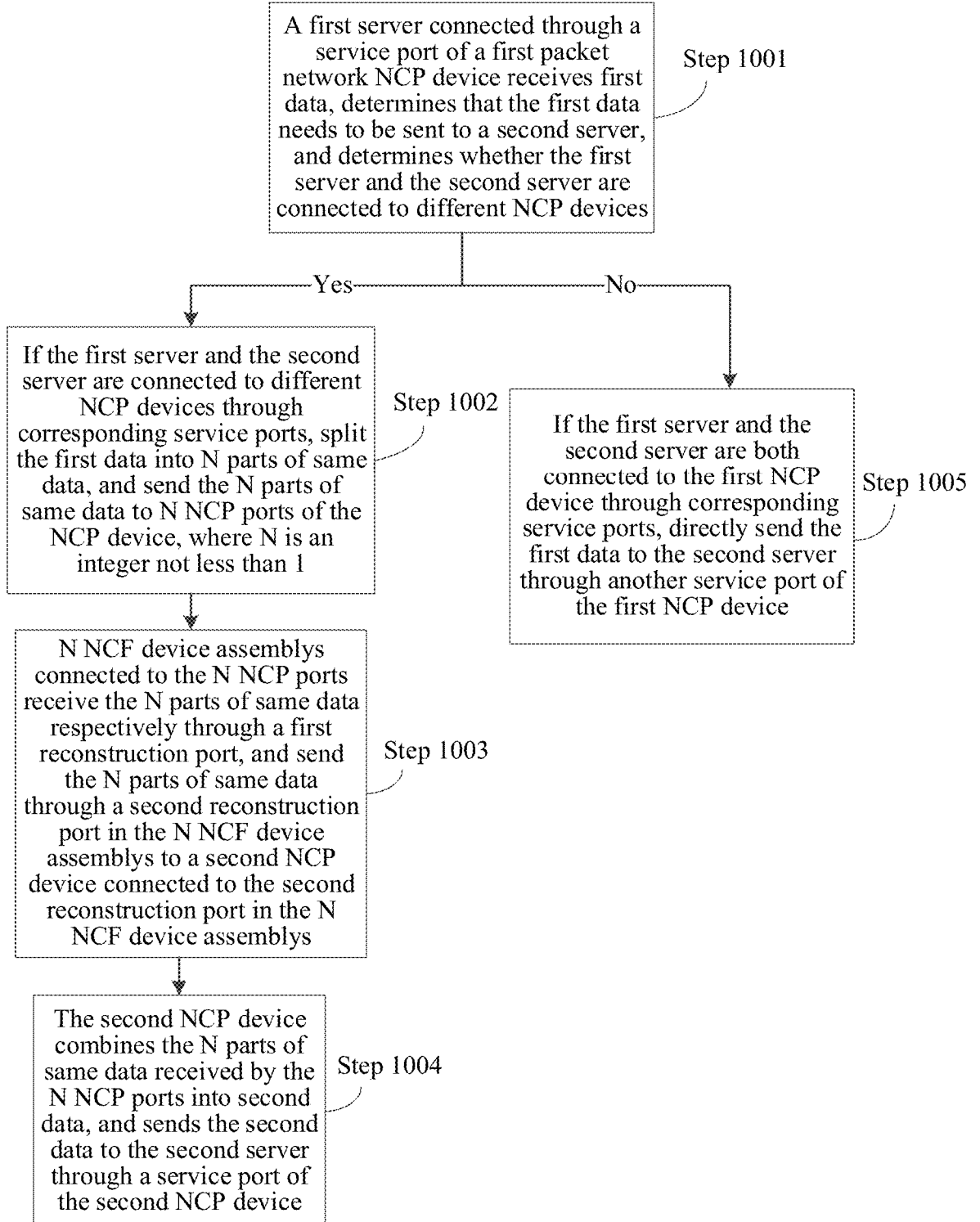

A first server connected through a service port of a first packet network NCP device receives first data, determines that the first data needs to be sent to a second server, and determines whether the first server and the second server are connected to different NCP devices Step 1001

Yes                                                    No

If the first server and the second server are connected to different NCP devices through corresponding service ports, split the first data into N parts of same data, and send the N parts of same data to N NCP ports of the NCP device, where N is an integer not less than 1

Step 1002

If the first server and the second server are both connected to the first NCP device through corresponding service ports, directly send the first data to the second server through another service port of the first NCP device Step 1005

N NCF device assemblys connected to the N NCP ports receive the N parts of same data respectively through a first reconstruction port, and send the N parts of same data through a second reconstruction port in the N NCF device assemblys to a second NCP device connected to the second reconstruction port in the N NCF device assemblys Step 1003

The second NCP device combines the N parts of same data received by the N NCP ports into second data, and sends the second data to the second server through a service port of the second NCP device Step 1004

FIG. 10

NCF DEVICE ASSEMBLY, DISTRIBUTED NETWORKING SYSTEM, AND DATA TRANSMISSION METHOD

CROSS-REFERENCE TO RELATED APPLICATIONS

This application is a continuation of International Application No. PCT/CN2024/085030, filed on Mar. 29, 2024, which claims priority to Chinese Patent Application No. 202310342107.3, filed with the China National Intellectual Property Administration on Mar. 31, 2023, and entitled "RECONSTRUCTION NCF DEVICE, DISTRIBUTED NETWORKING SYSTEM, AND DATA TRANSMISSION METHOD", which are incorporated herein by reference in their entireties.

TECHNICAL FIELD

This application relates to the field of network switching devices, and in particular, to an NCF device assembly, a distributed networking system, and a data transmission method.

BACKGROUND

With continuous development of big data, cloud, and AI, and especially popularity of a chat generative pre-trained transformer (Chat Generative Pre-trained Transformer, chatGPT), unprecedented requirements have been placed on a computing power network.

By splitting a chassis-based device into box-based devices, a DDC (Distributed Disaggregated Chassis, distributed disaggregated chassis) networking technology may create a cluster having a larger capacity than a conventional chassis-based device, without being limited by cabinet space, power supply, heat dissipation, and the like. FIG. 1 is a schematic diagram of DDC single-stage networking in the related art, where a network cloud fabric (Network Cloud Fabric, NCF) has M NCF ports, the NCF has a data switching function and is responsible for fully cross-connect networking of a network cloud packet forwarder (Network Cloud Packet Forwarder, NCP) device, and the NCP device has N service ports. Therefore, a maximum scale of DDC single-stage networking is M×N.

SUMMARY

Exemplary embodiments of this application provide a network cloud fabric NCF device assembly, including:

a first NCF device, including a first chip and a plurality of first NCF ports, where the first chip is electrically communicatively connected to at least one of the plurality of first NCF ports;

a second NCF device, including a second chip and a plurality of second NCF ports, where the second chip is electrically communicatively connected to at least one of the plurality of second NCF ports; and a reconstruction component optical cross-connect device, including a plurality of receiving ports and a plurality of reconstruction ports, where the plurality of receiving ports are communicatively connected to the first chip and the second chip respectively through at least one of the plurality of first NCF ports and at least one of the plurality of second NCF ports, where each of the plurality of reconstruction ports is optically communicatively connected to at least two of the plurality of receiving ports in the reconstruction component optical cross-connect device, so that each of the plurality of reconstruction ports is communicatively connected to the first chip and the second chip.

In a possible implementation, the first NCF device further includes a third chip, every n signal lanes in the first chip and the third chip constitute one of the plurality of first NCF ports, and n/2 lanes of the reconstruction port are respectively connected in a correspondence to one lane in the first chip or the third chip in the first NCF device, where n is a power of 2 and is greater than 0.

In a possible implementation, the second NCF device further includes a fourth chip, every n signal lanes in the second chip and the fourth chip constitute one of the plurality of second NCF ports, and n/2 lanes of the reconstruction port are respectively connected in a correspondence to one lane in the second chip or the fourth chip in the second NCF device.

In a possible implementation, every n signal lanes in the first chip in the first NCF device constitute one NCF port, and every n signal lanes in the third chip in the first NCF device constitute one NCF port.

In a possible implementation, every n/2 signal lanes in the first chip and every n/2 signal lanes in the third chip in the first NCF device constitute one NCF port.

In a possible implementation, the reconstruction component optical cross-connect device includes k optical cross-connect units, a quantity of the plurality of reconstruction ports is M, and each of the k optical cross-connect units includes M/k reconstruction ports, where M is an integer greater than 0 and is an even number, and k is a positive integer less than or equal to M.

In a possible implementation, the plurality of receiving ports receive optical signals.

In a possible implementation, the assembly further includes a box, and the first NCF device and the second NCF device are both fixed in the box of the NCF device assembly; and the reconstruction component optical cross-connect device is disposed on a side panel of the box, and a lane corresponding to each of the plurality of reconstruction ports is connected to one lane corresponding to the first NCF device or the second NCF device on an inner side of the box, and is connected in a correspondence to one NCP port in a network cloud packet forwarder NCP device on an outer side of the box.

In a possible implementation, a quantity of the plurality of reconstruction ports is M, and a quantity of the plurality of first NCF ports and a quantity of the plurality of second NCF ports are both M, where M is an integer multiple of X and M is greater than X.

In an implementation, this application further provides a distributed networking system, including:

at least one NCF device assembly as described above, where the at least one NCF device assembly includes a plurality of reconstruction ports; and a plurality of network cloud packet forwarder NCP devices, where one port of the plurality of reconstruction ports are connected in a one-to-one correspondence to one NCP port in the plurality of NCP devices.

In an implementation, this application further provides a data transmission method. The method is applied to the distributed networking system as described above and includes:

receiving, by a first server connected through a service port of a first network cloud packet forwarder NCP device, first data, and determining that the first data needs to be sent to a second server;

if the first server and the second server are connected to different NCP devices through corresponding service ports, splitting the first data into N parts of data, and sending the N parts of data to N NCP ports of a second NCP device connected to the second server, where N is an integer not less than 1;

receiving, by N NCF device assemblies connected to the N NCP ports, the N parts of data respectively through a first reconstruction port, and sending the N parts of data through a second reconstruction port in the N NCF device assemblies to a second NCP device connected to the second reconstruction port in the N NCF device assemblies; and combining, by the second NCP device, the N parts of data received by the N NCP ports into second data, and sending the second data to the second server through a service port of the second NCP device.

In a possible implementation, the method further includes:

if the first server and the second server are both connected to the first NCP device through corresponding service ports, directly sending the first data to the second server through another service port of the first NCP device.

In an implementation, this application further provides a distributed networking system, including:

a first server, configured to receive first data through a service port of a first network cloud packet forwarder NCP device, and determine that the first data needs to be sent to a second server; and if the first server and the second server are connected to different NCP devices through corresponding service ports, split the first data into N parts of data, and send the N parts of data to N NCP ports of the NCP device, where N is an integer not less than 1;

N NCF device assemblies, configured to connect to the N NCP ports, receive the N parts of data through a first reconstruction port, and send the N parts of data through a second reconstruction port in the N NCF device assemblies to a second NCP device connected to the second reconstruction port in the N NCF device assemblies; and the second NCP device, configured to combine the N parts of data received by the N NCP ports into second data, and send the second data to the second server through a service port of the second NCP device.

In a possible implementation, the first server is further configured to:

if the first server and the second server are both connected to the first NCP device through corresponding service ports, directly send the first data to the second server through another service port of the first NCP device.

According to the NCF device assembly, the distributed networking system, and the data transmission method provided in this application, a theoretical maximum quantity of ports can be achieved, and on a basis of distributed single-stage networking, a maximum scale of networking can be achieved, and costs and power consumption can be reduced.

BRIEF DESCRIPTION OF DRAWINGS

To describe the technical solutions in the embodiments of this application or in the conventional technology more clearly, the following briefly describes the accompanying drawings required for describing the embodiments or the conventional technology. Apparently, the accompanying drawings in the following description show merely some of the embodiments of this application, and a person of ordinary skill in the art may still derive other drawings of embodiments from these accompanying drawings without creative efforts.

Figure 1:
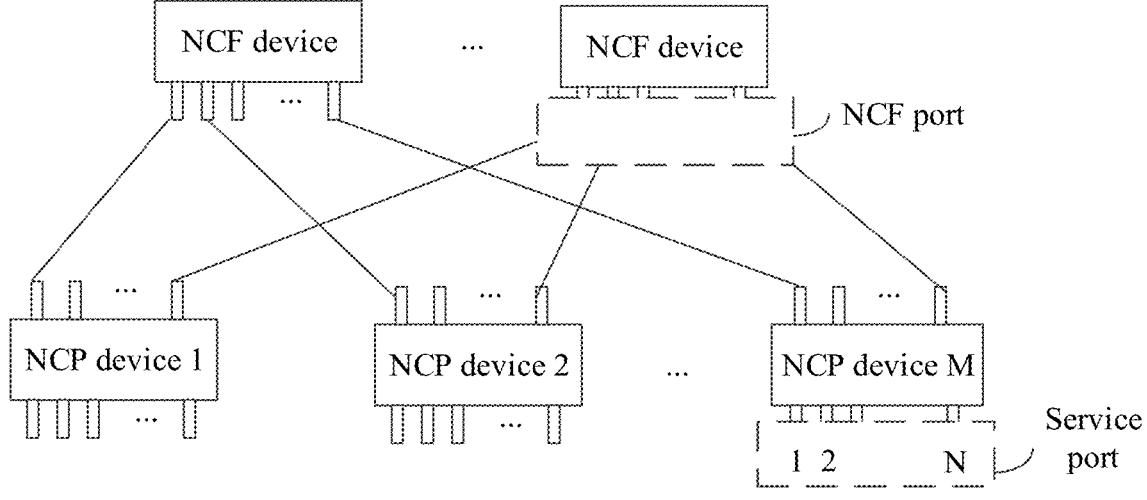
Figure 2:
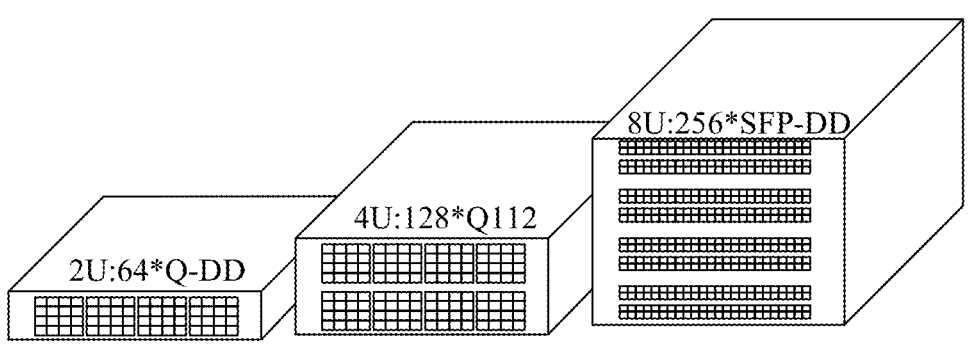
Figure 3:
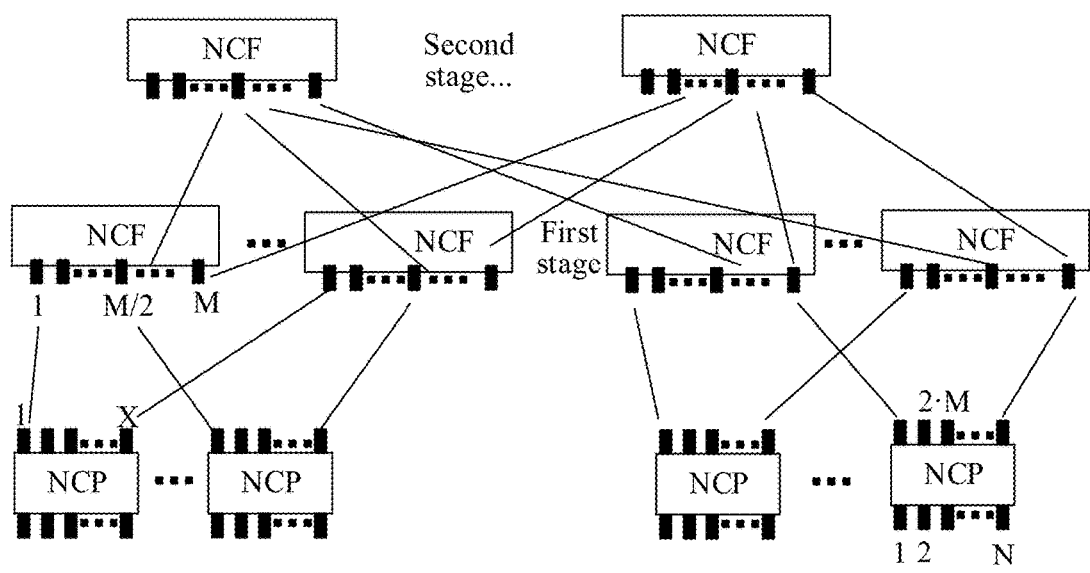
Figure 4:
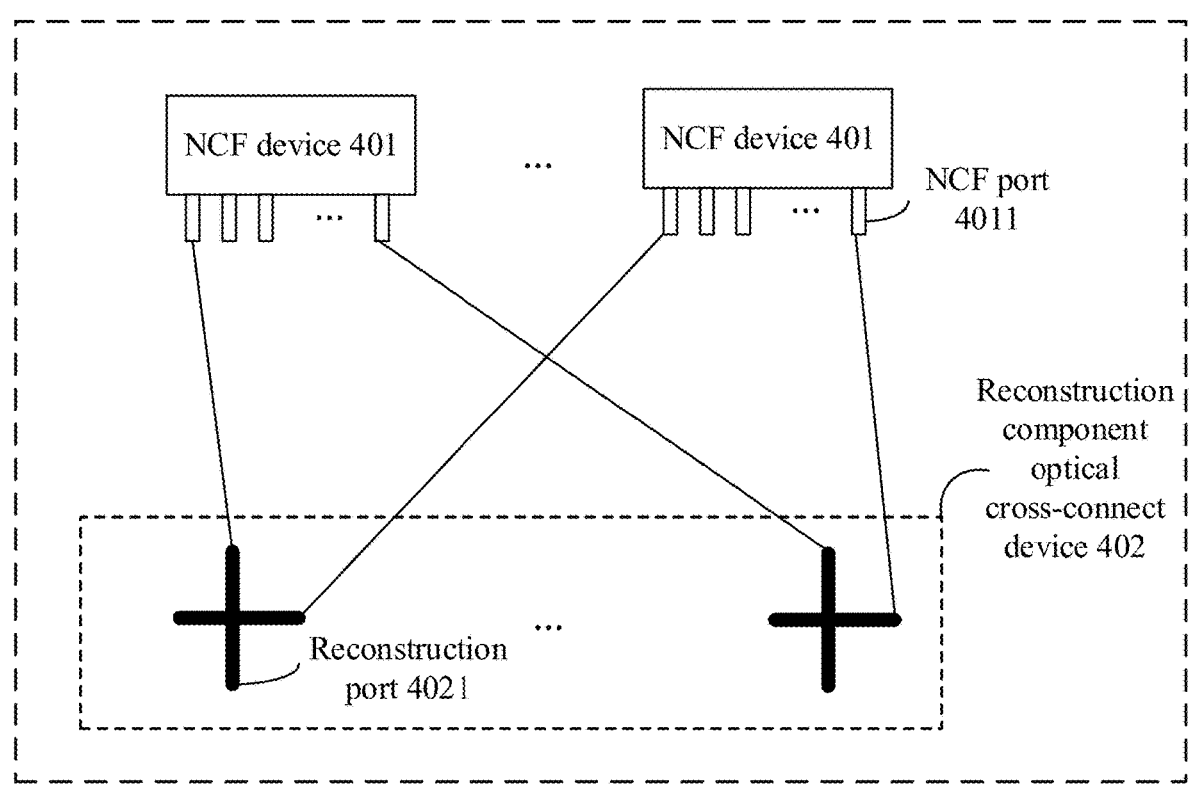
Figure 5:
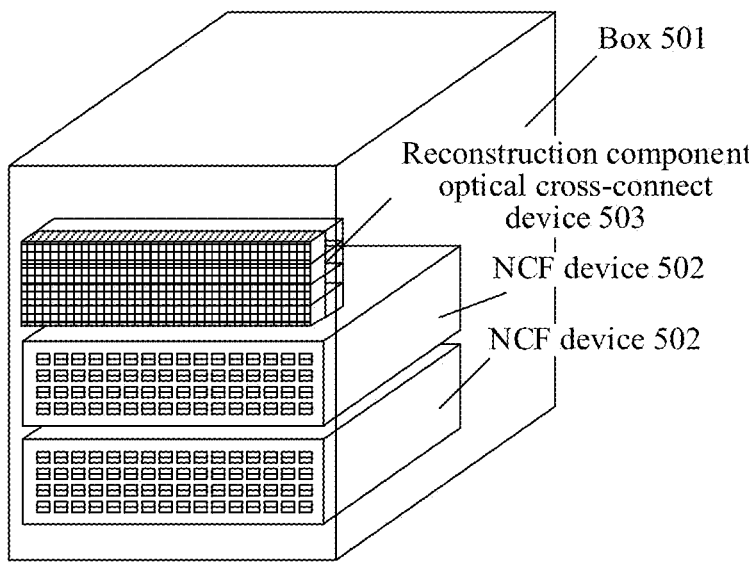
Figure 6:
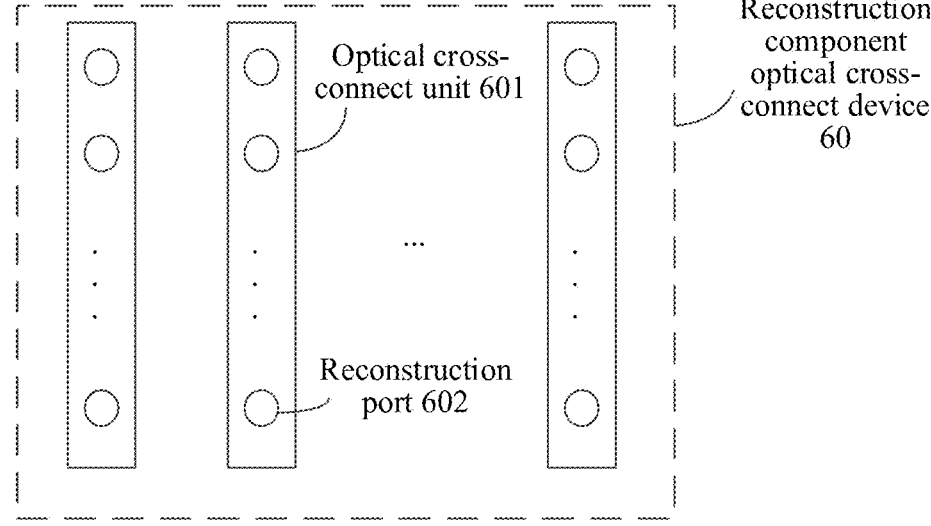
Figure 7:
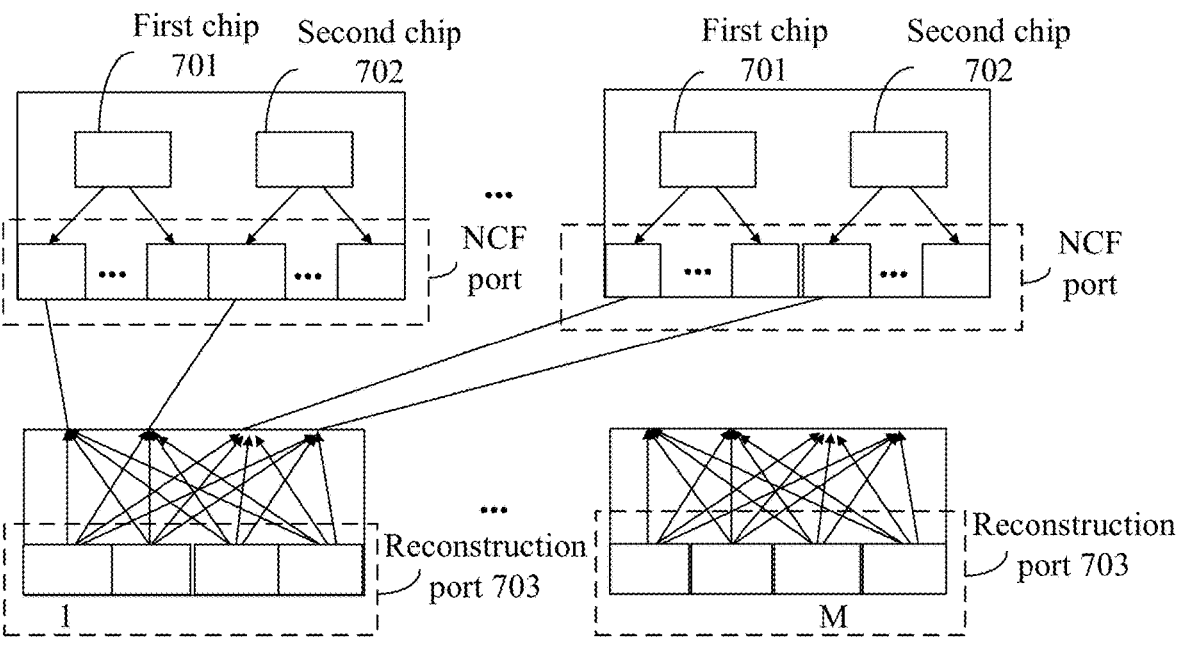
Figure 8:
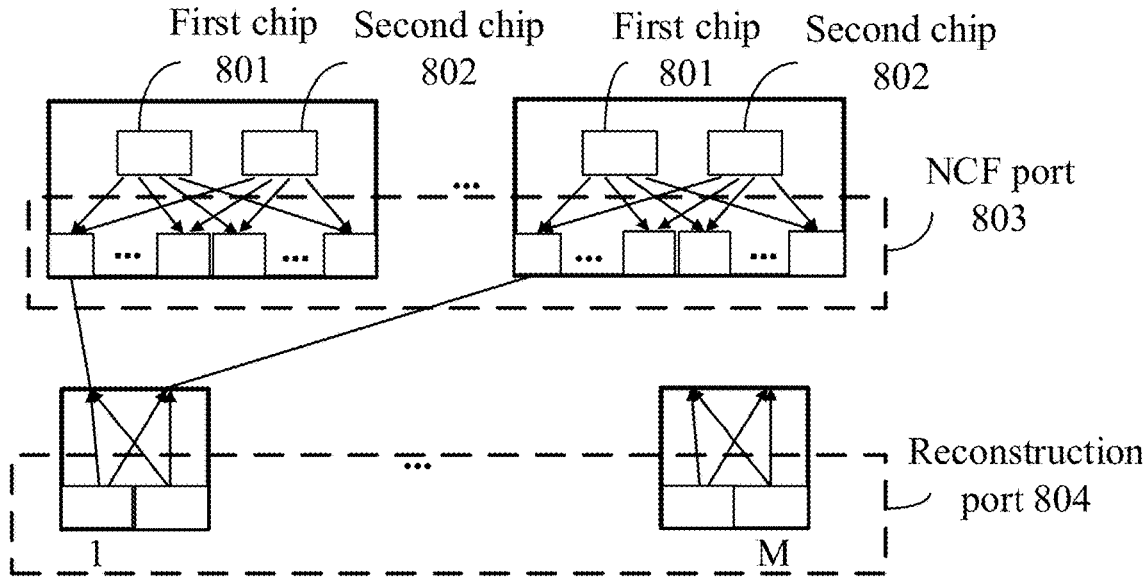
Figure 9:
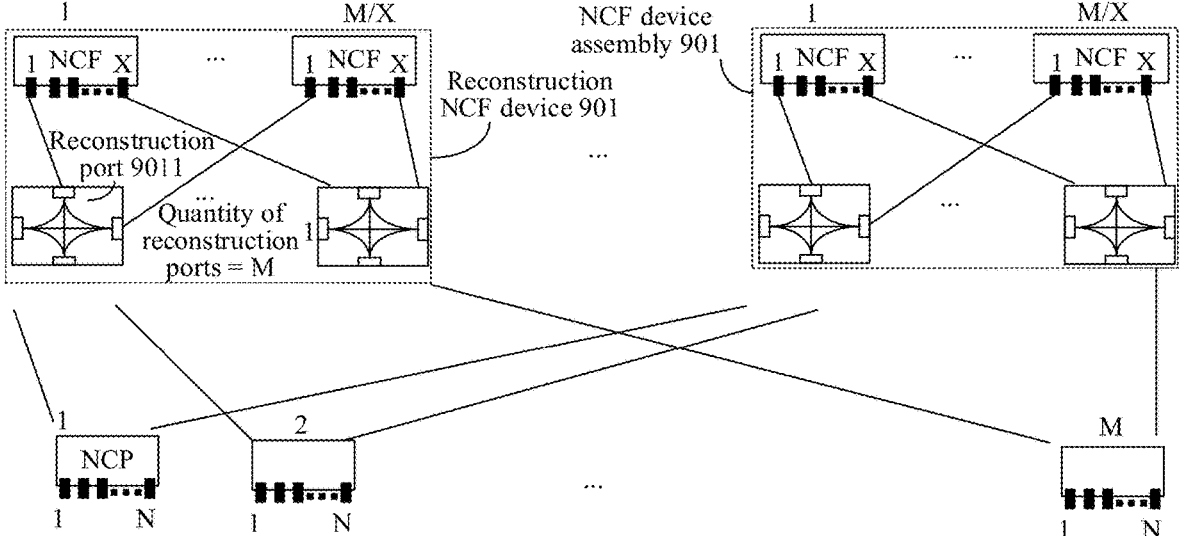

FIG. 1 is a schematic diagram of DDC single-stage networking in a conventional technology;

FIG. 2 is a schematic diagram of devices with different heights in a conventional technology;

FIG. 3 is a schematic diagram of DDC multi-stage networking in a conventional technology;

FIG. 4 is a schematic diagram of a device according to an embodiment of this application;

FIG. 5 is a schematic diagram of a device according to an embodiment of this application;

FIG. 6 is a schematic diagram of a device according to an embodiment of this application;

FIG. 7 is a schematic diagram of a lane connection relationship according to an embodiment of this application;

FIG. 8 is a schematic diagram of a lane connection relationship according to an embodiment of this application;

FIG. 9 is a schematic diagram of DDC single-stage networking according to an embodiment of this application; and FIG. 10 is a flowchart according to an embodiment of this application.

DESCRIPTION OF EMBODIMENTS

To make the objectives, technical solutions, and advantages of this application clearer, the following further describes this application with reference to the accompanying drawings. Apparently, the described embodiments are merely some but not all of the embodiments of this application. All other embodiments obtained by a person of ordinary skill in the art based on the embodiments of this application without creative efforts shall fall within the protection scope of this application.

In this application, use of ordinal terms such as "first" and "second" to modify elements does not indicate any priority, precedence, or order of one element relative to another element, or a time sequence of actions performed in a method. Unless otherwise specially stated, such ordinal terms are used only as labels to distinguish one element with a particular name from another element with the same name (except for the ordinal terms).

In a case that the terms "comprise", "have", and "include" described in this application are used, another component may also be added unless a definite restrictive term such as "only", or "consist of" is used. Unless otherwise mentioned, a term in a singular form may cover a plural form, and a quantity thereof cannot be understood as only one.

By splitting a chassis-based device into box-based devices, a DDC networking technology may create a cluster having a larger capacity than a conventional chassis-based device, without being limited by cabinet space, power supply, heat dissipation, and the like. A schematic diagram of DDC single-stage networking in the related art is shown in FIG. 1, where a quantity of NCF ports of an NCF device is M, a maximum quantity of connected NCP devices is also M, and a quantity of service ports of an NCP device is N. Therefore, a maximum scale of DDC single-stage networking is M×N. Therefore, to increase the scale of networking, a quantity of NCF ports of an NCF needs to be increased. M is an integer greater than 0 and is an even number.

Generally, the scale of networking is increased in two manners: increasing a device height and multi-stage networking. In the first manner, a theoretically developable dual-chip NCF device with 256 signal lanes per chip is used as an example. As shown in FIG. 2, when the NCF device is 2 U high, the NCF device includes 64 QDD ports, and each QDD port includes eight lanes. When the NCF device is 4 U high, the NCF device includes 128 Q112 ports, and each Q112 port includes four lanes. When the NCF device is 8 U high, the NCF device includes 256 SFP-DD ports, and each SFP-DD port includes two lanes. It can be learned that if a quantity of lanes included in each port is smaller, there are more ports, and a final networking scale is larger. However, when the NCF device is 8 U high, costs for implementing an electrical interconnection technology are very high. The SFP-DD port is not a mainstream form, featuring high customization cost and poor versatility. The high chassis also makes operation and maintenance difficult. In addition, mainstream 2 U and 4 U devices cannot achieve theoretical maximum networking.

In the second manner for increasing the scale of networking, a multi-stage networking method is also proposed. Specifically, a quantity of NCP devices is expanded by increasing a quantity of NCF devices. However, in a multi-stage networking solution, to double a quantity of NCP devices, NCF devices six times as many as original NCF devices are required, resulting in a waste of costs and power consumption. For example, the original single-stage networking includes a total of X NCF devices, each NCF device includes M NCF ports connected to M NCP devices, and each NCP device includes X NCP ports. Therefore, a total quantity of NCP ports is M*X. A schematic diagram of two-stage networking is shown in FIG. 3. There are 2*M NCP devices in total, a total quantity of NCP ports is 2*M*X, and a single NCF device has M/2 NCF ports connected to NCP devices. Therefore, a quantity of first-stage NCF devices is (2*M*X)/(M/2)=4*X. Second-stage NCF devices are connected to the first-stage NCF devices. A total quantity of NCF ports of the first-stage NCF devices to be connected is a total quantity of first-stage NCF devices multiplied by a quantity of NCF ports of one first-stage NCF device to which second-stage NCF devices are connected, that is, 4*X*M/2. A single second-stage NCF device includes M NCF ports. Therefore, a quantity of second-stage NCF devices is (4*X*M/2)/M=2*X. Therefore, a quantity of first-stage NCF devices and second-stage NCF devices is 4*X+2*X=6*X. In comparison with single-stage networking, to double the quantity of NCP devices, NCF devices six times as many as the original NCF devices are required, resulting in a waste of costs and power consumption.

Exemplary embodiments of this application provide an NCF device assembly, a distributed networking system, and a data transmission method. The NCF device assembly can achieve a theoretical maximum quantity of ports, that is, on a basis of distributed single-stage networking, achieve a maximum scale of networking, and reduce costs and power consumption.

An embodiment of this application provides an NCF device assembly. FIG. 4 is a modular diagram of an NCF device assembly, including a plurality of network-configured NCF devices 401 and a reconstruction component optical cross-connect device 402.

Each of the plurality of network-configured NCF devices 401 includes at least one chip and X NCF ports 4011, and every n signal lanes in the at least one chip constitute one NCF port 4011, where n is a power of 2 and is greater than 0, for example, may be 1, 2, or 4.

Optionally, for an NCF device, a total quantity of lanes may be from one chip or from a plurality of chips. For example, an NCF device has a total of 256 lanes. If the NCF device has only one chip, a quantity of lanes of this chip is 256. If the NCF device has two chips, a quantity of lanes of one chip is 128. A quantity of lanes in an NCF device includes a total quantity of lanes of chips. A total quantity of NCF ports is determined based on the total quantity of lanes in the NCF device and a quantity of lanes of each NCF port. For example, if one NCF device includes 256 lanes, and each NCF port needs to include four lanes, a quantity of NCF ports of the NCF device is 64. A quantity of lanes of an NCF port depends on a quantity of lanes of an NCP port of an NCP device connected to the NCF port. The quantity of lanes of the NCF port is the same as the quantity of lanes of the NCP port. In this application, when constituting an NCF port in the NCF device, n lanes may be from a same chip or from different chips.

The reconstruction component optical cross-connect device 402 includes M reconstruction ports 4021, each reconstruction port 4021 includes n lanes, the n lanes are respectively connected in a correspondence to one lane in n different chips in a plurality of different NCF devices 401, and the M reconstruction ports 4021 are connected in a one-to-one correspondence to one NCP port in each of M network cloud packet forwarder NCP devices.

Optionally, optical fibers may be used to interconnect ports inside the reconstruction component optical cross-connect device 402. A person skilled in the art should know that in some embodiments, the reconstruction component optical cross-connect device 402 can convert optical/electrical signals. In other embodiments, optical/electrical signals may also be converted by an external device of the reconstruction component optical cross-connect device 402. The external device for optical/electrical signal conversion may be disposed in the NCF device assembly or disposed outside the NCF device assembly. A person skilled in the art should know that in other embodiments, the reconstruction component optical cross-connect device 402 may cross-connect pure optical signals. In the NCF device, interconnection is based on electrical signals, and optical/electrical conversion is performed. Optical signals are input or output from an NCF port, and the NCF port is connected to the reconstruction component optical cross-connect device 402 by using the optical signals.

Optionally, n lanes included in one reconstruction port 4021 come from a plurality of NCF devices, which is equivalent to using the lanes of the plurality of NCF devices as a total quantity of lanes of the NCF device assembly. Therefore, a quantity of reconstructed reconstruction ports is an integer multiple of X. For example, as shown in FIG. 4, there are two NCF devices, each NCF device has 128 lanes, there are a total of 256 lanes, and each port includes four lanes. In this case, a quantity X of ports of each NCF device is 32. Because one reconstruction port includes four lanes, the reconstruction component optical cross-connect device 402 can reconstruct 64 reconstruction ports, that is, the quantity of reconstructed reconstruction ports is twice the quantity X of ports of each NCF device. Because the quantity of reconstruction ports is doubled in comparison with an original quantity of NCP ports, a quantity of NCP ports connected to the reconstruction ports is also doubled, and ultimately, an objective of expanding the scale of single-stage networking is achieved.

According to the NCF device assembly provided in the exemplary embodiments of this application, a theoretically larger quantity of ports can be achieved, a maximum quantity of NCP devices can be connected, and on a basis of distributed single-stage networking, a maximum scale of networking can be achieved, and costs and power consumption can be reduced.

Optionally, each NCF device includes one chip, and the n lanes in the reconstruction port are respectively connected in a correspondence to one lane in n different chips in n different NCF devices.

For example, each NCF device includes a first chip and a second chip, and the n lanes in the reconstruction port are respectively connected in a correspondence to one lane in n different chips in n/2 different NCF devices.

For ease of understanding, optionally, an example is used for description, where one NCF device includes one chip or two chips, one chip includes 256 lanes, and each NCF port includes four lanes.

When it is determined that the used NCF device includes one chip, it is determined that four NCF devices are required for reconstruction. One chip in each NCF device includes 256 lanes, and every four lanes constitute one NCF port. Therefore, one NCF device includes 64 NCF ports. The NCF device assembly includes 256 reconstruction ports, and each reconstruction port includes four lanes. The four lanes in the reconstruction port come from four different chips in four different NCF devices. Compared with a quantity of NCF ports in a single NCF device, a quantity of reconstruction ports is expanded four times equivalently. The 256 reconstruction ports may be connected in a one-to-one correspondence to one NCP port in each of 256 NCP devices.

Alternatively, similarly, it is determined that two NCF devices are required for reconstruction. One chip in each NCF device includes 256 lanes, and every four lanes constitute one NCF port. Therefore, one NCF device includes 64 NCF ports. The NCF device assembly includes 128 reconstruction ports, each reconstruction port includes four lanes, and the four lanes in the reconstruction port come from two different chips in two different NCF devices. It means that two lanes in one NCF device and two lanes in the other NCF device constitute one reconstruction port, and that 128 reconstruction ports are included in total. A quantity of reconstruction ports is doubled equivalently. The 128 reconstruction ports may be connected in a one-to-one correspondence to one NCP port in each of 128 NCP devices.

Optionally, when it is determined that the used NCF device is a dual-chip device, it is determined that two NCF devices are required for reconstruction. Two chips in each NCF device are two identical chips. To distinguish between the two chips in each NCF device, one chip is described as a first chip, and the other chip is described as a second chip. The first chip in each NCF device includes 256 lanes, and the second chip also includes 256 lanes. Every four lanes constitute one NCF port. Therefore, one NCF device includes 128 NCF ports. Similarly, the NCF device assembly includes 256 reconstruction ports, each reconstruction port includes four lanes, and the four lanes in the reconstruction port come from four different chips in the two NCF devices respectively. The 256 reconstruction ports may be connected in a one-to-one correspondence to one NCP port in each of 256 NCP devices.

Optionally, as shown in FIG. 5, the NCF device assembly includes a box 501, and a plurality of NCF devices 502 are fixed in the box 501 of the NCF device assembly.

The reconstruction component optical cross-connect device 503 is disposed on a side panel of the box, and each lane of each reconstruction port is connected to one lane of an NCF device on an inner side of the box, and is connected in a correspondence to one NCP port in one network cloud packet forwarder NCP device on an outer side of the box.

Optionally, as shown in FIG. 6, the reconstruction component optical cross-connect device 60 includes k optical cross-connect units 601, and each of the k optical cross-connect units includes M/k reconstruction ports 602. For example, the reconstruction component optical cross-connect device includes 256 reconstruction ports in total. The reconstruction component optical cross-connect device includes a plurality of optical cross-connect units, and each optical cross-connect unit includes eight reconstruction ports. In this case, 32 optical cross-connect units are required to constitute the reconstruction component optical cross-connect device with 256 reconstruction ports. M is an integer greater than 0 and is an even number, and k is a positive integer less than or equal to M.

Optionally, when it is determined that the used NCF device is a dual-chip device, n lanes in a reconstruction port are connected in a correspondence to one lane in n different chips in a plurality of different NCF devices in two manners. In a first manner, as shown in FIG. 7, which is a schematic diagram of a lane connection relationship in each chip, every n signal lanes of a first chip 701 in each NCF port constitute one NCF port, and every n signal lanes of a second chip 702 in each NCF port constitute one NCF port. Therefore, the NCF ports are classified into two types, where one type is an NCF port that includes only the n lanes of the first chip, and the other type is an NCF port that includes only the n lanes of the second chip, and the lanes of the two chips are not cross-connected. Therefore, one reconstruction port 703 requires n/2 NCF devices and one lane in the two types of NCF ports in each NCF device, a reconstruction port including n lanes is finally constituted, and the lanes come from different chips. In a second manner, as shown in FIG. 8, which is a schematic diagram of a lane connection relationship in each chip, every n/2 signal lanes of a first chip 801 and every n/2 signal lanes of a second chip 802 in each NCF port constitute one NCF port 803. In this case, all NCF ports in the entire NCF device are completely the same ports, each NCF port includes n/2 lanes from the first chip and n/2 lanes from the second chip, each NCF port has n lanes in total, and the lanes of the two chips are cross-connected. Therefore, one reconstruction port 804 requires n/2 NCF devices and two lanes in each NCF port, and the two lanes are respectively a lane from the first chip and a lane from the second chip.

Optionally, when one NCF device includes X NCF ports and the reconstruction component optical cross-connect device includes M reconstruction ports, it is determined that M is an integer multiple of X, and that M does not exceed n*X. For example, a single-chip NCF device includes 64 NCF ports, each NCF port includes four lanes, and a quantity of reconstruction ports cannot exceed 64*4. Based on a plurality of NCF devices, an NCF device assembly including 128 reconstruction ports or an NCF device assembly including 256 reconstruction ports may be disposed. When it is determined that an NCF device assembly with 128 reconstruction ports is required, two single-chip NCF devices are required, and two lanes in an NCF port of one NCF device and two lanes in an NCF port of the other NCF device constitute one reconstruction port including four lanes. Therefore, a quantity of reconstruction ports that can be achieved is 128. Similarly, when it is determined that an NCF device assembly with 256 reorganization ports is required, four single-chip NCF devices are required, and one lane in an NCF port in each of the NCF devices constitutes a reconstruction port including four lanes, and the chips in the NCF devices have 256 lanes in total. Therefore, a quantity of reconstruction ports that can be achieved is 256.

The NCF device assembly provided in this application can achieve a theoretical maximum quantity of ports, that is, on a basis of distributed single-stage networking, achieve a maximum scale of networking, and reduce costs and power consumption.

Based on the same inventive concept, this application further provides a distributed networking system, as shown in FIG. 9, including: at least one NCF device assembly 901 as described above, where each NCF device assembly includes M reconstruction ports 9011; and > M network cloud packet forwarder NCP devices 902, where the M reconstruction ports in each NCF device assembly are connected in a one-to-one correspondence to one NCP port in each of the M network cloud packet forwarder NCP devices.

Optionally, the networking system is a single-stage networking system, and each network cloud packet forwarder NCP device includes X NCP ports. In this case, a maximum quantity of NCF device assemblies connected to the M network cloud packet forwarder NCP devices is X. Because a quantity of reconstruction ports of each NCF device assembly is increased in comparison with a quantity of NCP ports, a scale of single-stage networking that can be achieved is also increased.

Based on the same inventive concept, this application further provides a data transmission method, applied to a distributed networking system. As shown in FIG. 10, the method includes the following steps.

Step 1001: A first server connected through a service port of a first network cloud packet forwarder NCP device receives first data, determines that the first data needs to be sent to a second server, and determines whether the first server and the second server are connected to different NCP devices. If yes, step 1002 is performed; otherwise, step 1005 is performed.

Step 1002: If the first server and the second server are connected to different NCP devices through corresponding service ports, split the first data into N parts of data, and send the N parts of data to N NCP ports of the NCP device, where N is an integer not less than 1.

Step 1003: N NCF device assemblies connected to the N NCP ports receive the N parts of data respectively through a first reconstruction port, and send the N parts of data through a second reconstruction port in the NNCF device assemblies to a second NCP device connected to the second reconstruction port in the N NCF device assemblies.

Step 1004: The second NCP device combines the N parts of data received by the N NCP ports into second data, and sends the second data to the second server through a service port of the second NCP device.

Optionally, the method further includes step 1005: If the first server and the second server are both connected to the first NCP device through corresponding service ports, directly send the first data to the second server through another service port of the first NCP device.

FIG. 10 is a schematic flowchart of a method according to an embodiment of this application. It should be understood that although various steps in the flowchart in FIG. 10 are displayed in sequence as indicated by arrows, these steps are not necessarily performed in sequence according to the order indicated by the arrows. Unless otherwise clearly stated in this specification, an execution order of these steps is not strictly limited, and the steps may be performed in other orders. Moreover, at least some steps in FIG. 10 may include a plurality of substeps or a plurality of stages, and these substeps or stages are not necessarily performed at the same time, but may be performed at different times. An execution order of the substeps or stages is not necessarily sequential execution. Instead, the substeps or stages may be performed in turn or alternately with at least a part of other steps or substeps or stages of other steps.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various changes and variations to this application without departing from the spirit and scope of this application. Therefore, this application is also intended to cover the changes and variations provided that the changes and variations of this application fall within the scope of the claims of this application or equivalent technologies thereof.

What is claimed is:

1. A network cloud fabric (NCF) device assembly, comprising:

> a first NCF device, comprising a first chip and a plurality of first NCF ports, wherein the first chip is electrically communicatively connected to at least one of the plurality of first NCF ports;
>
> a second NCF device, comprising a second chip and a plurality of second NCF ports, wherein the second chip is electrically communicatively connected to at least one of the plurality of second NCF ports; and a reconstruction component optical cross-connect device, comprising a plurality of receiving ports and a plurality of reconstruction ports, wherein the plurality of receiving ports are communicatively connected to the first chip and the second chip respectively through at least one of the plurality of first NCF ports and at least one of the plurality of second NCF ports, wherein each of the plurality of reconstruction ports is optically communicatively connected to at least two of the plurality of receiving ports in the reconstruction component optical cross-connect device, so that each of the plurality of reconstruction ports is communicatively connected to the first chip and the second chip, and the reconstruction component optical cross-connect device comprises k optical cross-connect units, a quantity of the plurality of reconstruction ports is M, and each of the k optical cross-connect units comprises M/k reconstruction ports, wherein M is an integer greater than 0 and is an even number, and k is a positive integer less than M.

2. The assembly according to claim 1, wherein the first NCF device further comprises a third chip, every n signal lanes in the first chip and the third chip constitute one of the plurality of first NCF ports, and n/2 lanes of one of the reconstruction ports are respectively connected in a correspondence to one lane in the first chip or the third chip in the first NCF device, wherein n is a power of 2 and is greater than 0.

3. The assembly according to claim 2, wherein the second NCF device further comprises a fourth chip, every n signal lanes in the second chip and the fourth chip constitute one of the plurality of second NCF ports, and n/2 lanes of one of the reconstruction ports are respectively connected in a correspondence to one lane in the second chip or the fourth chip in the second NCF device.

4. The assembly according to claim 2, wherein every n signal lanes in the first chip in the first NCF device constitute one NCF port, and every n signal lanes in the third chip in the first NCF device constitute one NCF port.

5. The assembly according to claim 3, wherein every n/2 signal lanes in the first chip and every n/2 signal lanes in the third chip in the first NCF device constitute one NCF port.

6. The assembly according to claim 1, wherein the plurality of receiving ports receive optical signals.

7. The assembly according to claim 1, wherein the assembly further comprises a box, and the first NCF device and the second NCF device are both fixed in the box of the NCF device assembly; and the reconstruction component optical cross-connect device is disposed on a side panel of the box, and a lane corresponding to each of the plurality of reconstruction ports is connected to one lane corresponding to the first NCF device or the second NCF device on an inner side of the box, and is connected in a correspondence to one NCP port in a packet network NCP device on an outer side of the box.

8. A distributed networking system, comprising:

at least one NCF device assembly according to claim 1, wherein the at least one NCF device assembly comprises a plurality of reconstruction ports; and a plurality of packet network NCP devices, wherein the plurality of reconstruction ports are connected in a one-to-one correspondence to one NCP port in the plurality of NCP devices.

9. A data transmission method, applied to the distributed networking system according to claim 8, and comprising:

receiving, by a first server connected through a service port of a first packet network NCP device, first data, and determining that the first data needs to be sent to a second server;

when the first server and the second server are connected to different NCP devices through corresponding service ports, splitting the first data into N parts of data, and sending the N parts of data to N NCP ports of a second NCP device connected to the second server, wherein N is an integer not less than 1;

receiving, by N NCF device assemblies connected to the N NCP ports, the N parts of data respectively through a first reconstruction port, and sending the N parts of data through a second reconstruction port in the N NCF device assemblies to a second NCP device connected to the second reconstruction port in the N NCF device assemblies; and combining, by the second NCP device, the N parts of data received by the N NCP ports into second data, and sending the second data to the second server through a service port of the second NCP device.

10. The method according to claim 9, wherein the method further comprises:

when the first server and the second server are both connected to the first NCP device through corresponding service ports, directly sending the first data to the second server through another service port of the first NCP device.

11. A distributed networking system, comprising:

a first server, configured to receive first data through a service port of a first packet network NCP device, and determine that the first data needs to be sent to a second server; and when the first server and the second server are connected to different NCP devices through corresponding service ports, split the first data into N parts of data, and send the N parts of data to N NCP ports of the NCP device, wherein N is an integer not less than 1;

N NCF device assemblies according to claim 1, configured to connect to the N NCP ports, receive the N parts of data through a first reconstruction port, and send the N parts of data through a second reconstruction port in the N NCF device assemblies to a second NCP device connected to the second reconstruction port in the N NCF device assemblies; and the second NCP device, configured to combine the N parts of data received by the N NCP ports into second data, and send the second data to the second server through a service port of the second NCP device.

12. The system according to claim 11, wherein the first server is further configured to:

when the first server and the second server are both connected to the first NCP device through corresponding service ports, directly send the first data to the second server through another service port of the first NCP device.

13. The assembly according to claim 1, wherein a quantity of the plurality of reconstruction ports is M, and a quantity of the plurality of first NCF ports and/or a quantity of the plurality of second NCF ports is X, wherein M is an integer multiple of X and M is greater than X.

14. A network cloud fabric (NCF) device assembly, comprising:

a first NCF device, comprising a first chip and a plurality of first NCF ports, wherein the first chip is electrically communicatively connected to at least one of the plurality of first NCF ports;

a second NCF device, comprising a second chip and a plurality of second NCF ports, wherein the second chip is electrically communicatively connected to at least one of the plurality of second NCF ports; and a reconstruction component optical cross-connect device, comprising a plurality of receiving ports and a plurality of reconstruction ports, wherein the plurality of receiving ports are communicatively connected to the first chip and the second chip respectively through at least one of the plurality of first NCF ports and at least one of the plurality of second NCF ports, wherein each of the plurality of reconstruction ports is optically communicatively connected to at least two of the plurality of receiving ports in the reconstruction component optical cross-connect device, so that each of the plurality of reconstruction ports is communicatively connected to the first chip and the second chip, and the first NCF device further comprises a third chip, every n signal lanes in the first chip and the third chip constitute one of the plurality of first NCF ports, and n/2 lanes of one of the reconstruction ports the reconstruction port are respectively connected in a correspondence to one lane in the first chip or the third chip in the first NCF device, wherein n is a power of 2 and is greater than 0.

15. The assembly according to claim 14, wherein the second NCF device further comprises a fourth chip, every n signal lanes in the second chip and the fourth chip constitute one of the plurality of second NCF ports, and n/2 lanes of one of the reconstruction ports are respectively connected in a correspondence to one lane in the second chip or the fourth chip in the second NCF device.

16. The assembly according to claim 14, wherein every n signal lanes in the first chip in the first NCF device constitute one NCF port, and every n signal lanes in the third chip in the first NCF device constitute one NCF port.

17. The assembly according to claim 15, wherein every n/2 signal lanes in the first chip and every n/2 signal lanes in the third chip in the first NCF device constitute one NCF port.

* * * * *